Aug. 12, 1958 D. L. CURTIS 2,847,159

PASSIVE ELEMENT SIGNAL STEPPING DEVICE

Filed July 22, 1952 4 Sheets-Sheet 1

INVENTOR.
DANIEL L. CURTIS
BY
Seymour M. Rosenberg
ATTORNEY.

PASSIVE ELEMENT SIGNAL STEPPING DEVICE

Filed July 22, 1952 4 Sheets-Sheet 2

INVENTOR.
DANIEL L. CURTIS
BY
Seymour M. Rosenberg
ATTORNEY.

PASSIVE ELEMENT SIGNAL STEPPING DEVICE

Filed July 22, 1952 4 Sheets-Sheet 3

INVENTOR.
DANIEL L. CURTIS
BY
Seymour M. Rosenberg
ATTORNEY

INVENTOR.
DANIEL L. CURTIS
BY
Seymour M. Greenberg
ATTORNEY

United States Patent Office 2,847,159

Patented Aug. 12, 1958

2,847,159

PASSIVE ELEMENT SIGNAL STEPPING DEVICE

Daniel L. Curtis, Venice, Calif., assignor, by mesne assignments, to Hughes Aircraft Company, a corporation of Delaware Application July 22, 1952, Serial No. 300,286

18 Claims. (Cl. 235—61)

This invention relates to a passive element signal stepping device, and more particularly to a passive element signal stepping device which is responsive to an applied electrical drive signal for sequentially stepping an applied electrical intelligence signal through the device.

The term "signal stepping device," as herein utilized, is considered generic to signal shifting devices, such as electronic shifting registers, and to signal delaying devices, such as electronic delay lines. In particular, the term "step" denotes both time delay of an electrical signal and physical shift of the electrical signal within the passive element device of this invention.

In many electronic systems, and more particularly, in electronic digital computers, it is often required that electrical signals corresponding to binary-coded intelligence information be delayed for relatively short time intervals before being utilized further in the operational sequence of the system. In the computer art, time delay devices of this nature are more often referred to as short access storage elements and are provided by electronic shifting registers and delay lines.

The most common type of shifting register of the prior art employs at least one bistable multivibrator or flip-flop for delaying electrical signals or providing short access storage therefor. In this type of shifting register, one flip-flop is provided for each electrical signal which is to be delayed or stored, or for each digit time interval during which each signal is to be delayed or stored. Prior art shifting registers of this type require complex electrical circuits in order to store even a relatively small number of electrical signals, and have the additional disadvantages of being relatively expensive and requiring large electrical power drains. In addition, shifting registers employing flip-flop storage elements are also subject to failure and aging of the associated vacuum tube components, thereby materially affecting the reliability of the register.

Still another prior art device which has been utilized extensively in the computer art for providing short access storage is the acoustic delay line. In this type of prior art device, an acoustic medium such as mercury, for example, is utilized for transmitting mechanical vibrations corresponding to the electrical signal which is to be delayed. One of the principal disadvantages of this type of prior art device is that variations in the temperature of the mercury result in concomitant variations in the delay interval afforded by the device, thereby inherently limiting the operating conditions to which the delay line may be subjected. In addition, acoustic delay lines of this nature require complex input and output transducer elements and associated electronic circuits in order to convert applied electrical signals into mechanical vibrations and vice versa. Accordingly, the resultant delay units are customarily heavy, bulky and expensive.

The present invention, on the other hand, discloses signal stepping devices which obviate the above and other disadvantages of the prior art by utilizing only conventional passive electronic elements for delaying or storing applied electrical intelligence signals. According to the basic feature of this invention, the signal stepping device comprises a fundamental delay unit, hereinafter termed a delay section, including first and second storage capacitors chargeable to first and second normal charge values, respectively. The delay section operates in response to a voltage level change in the signal applied from a source of electrical intelligence signals first to transfer charge between the source and the first capacitor and then to transfer charge between the first and second capacitors, thereby restoring the charge on the first capacitor to its normal value. In order to control the sequence of charge transfer and to determine the total delay provided by the delay section, a periodic drive signal having a frequency corresponding to the digit frequency of the intelligence signal is applied to each storage capacitor.

More particularly, each of the delay sections, according to the present invention, includes first and second storage capacitors each having separate charge and discharge paths, the charging path of one of the capacitors being the discharge path of the other. In order to properly control the charging and discharging of the first and second capacitors, each delay section also includes two unidirectional current devices or diodes, one of which is utilized for intercoupling the first storage capacitor and the source of intelligence signals, the other unidirectional current device being utilized for intercoupling the first and second storage capacitors. Each unidirectional current device is rendered conductive by a differential voltage of a predetermined polarity thereby permitting charge transfer to and from the first and second storage capacitors, the duration of the transfer being controlled by the voltage swings of a periodic drive signal impressed on one end of each of the capacitors.

Each of the delay sections of the present invention also includes at least one inductor which is connected in the charge transfer path including thhe first and second capacitors. If the resonant frequency of the combination of the inductor and the first and second storage capacitors is substantially the same as or higher than the frequency of the periodic drive signal, a half cycle "ringing" phenomenon results thereby providing substantially complete differential charge transfer between the first and second storage capacitors each time the delay section responds to a change in the potential of the applied intelligence signal.

In order to maintain a predetermined normal charge on the first and second storage capacitors, the delay sections of the present invention have a terminating potential applied thereto, the magnitude and waveform of the the terminating potential being a function of the drive signal impressed on the storage capacitors, the voltage magnitude of the applied intelligence signal, and the polarization of the associated unidirectional current devices. The unidirectional current devices function to effectively clamp the potential at one end of each of the first and second storage capacitors, and, in cooperation with the drive signal, to maintain the voltage swings at the one end of the capacitors between predetermined limits which are a function of the potential of the applied intelligence and terminating signals.

It is, therefore, an object of the present invention to provide a passive element signal stepping device which is operable to step an applied electrical intelligence signal to and from electrically reactive components under the control of an applied periodic drive signal.

Another object of this invention is to provide a passive element signal stepping device for stepping electrical signals at a rate dependent upon the frequency of an applied periodic squarewave drive signal.

An additional object of this invention is to provide passive element signal stepping devices which utilize controlled charge transfer to and from capacitive components for propagating an applied signal through the device in a predetermined time interval.

A further object of this invention is to provide passive element signal stepping devices which utilize the controlled charge and discharge of storage capacitors for sequentially shifting an applied electrical intelligence signal through the device.

It is also an object of this invention to provide passive element signal stepping devices which propagate an applied intelligence signal, by electrical energy transfer between capacitive components, at a rate determined by an applied periodic drive signal.

Still another object of this invention is to provide passive element signal stepping devices which comprise a plurality of storage capacitors responsive to an applied periodic drive signal for sequentially transferring an electrical charge, corresponding to an applied intelligence signal, between adjacent capacitors in discrete sequential time intervals.

It is an additional object of this invention to provide passive element signal stepping devices which operate firstly to transfer electrical energy between a source of applied intelligence signals and a first storage capacitor, and secondly between the first and a second storage capacitor, each energy transfer taking place in a discrete time interval.

It is still further an object of this invention to provide a passive element signal stepping device employing a plurality of signal stepping capacitors, the charging path of each capacitor being the discharge path of an adjacent capacitor.

It is still an additional object of this invention to provide passive element signal stepping devices comprising at least two signal stepping capacitors normally charged to predetermined values, respectively, one capacitor responding to changes in the voltage level of an applied intelligence signal to vary its charge from the normal, the other capacitor being responsive to variations in charge on said one capacitor for returning the charge on said one capacitor to its normal value.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
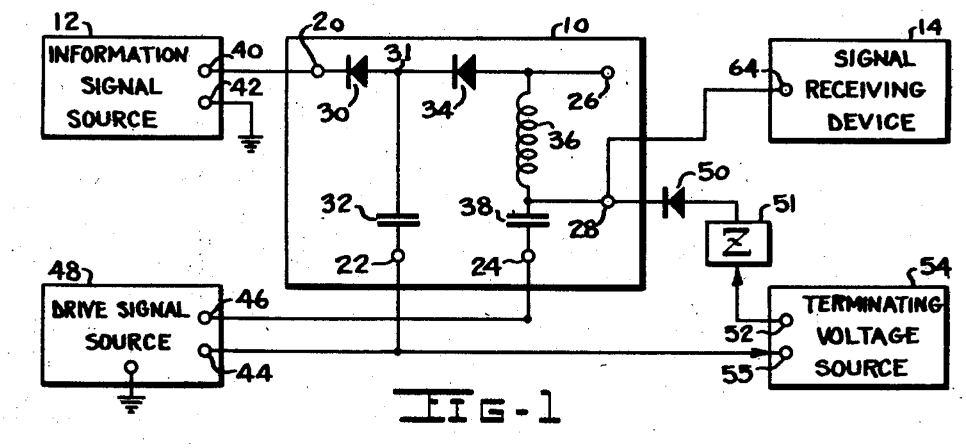
Fig. 1 is a schematic diagram of a one-section signal stepping device, according to this invention.

Referring now to the drawings, there is shown in Fig. 1 a delay section 10, according to one embodiment of this invention, for applying electrical signals from a source 12 of electrical digital information signals to an electrical signal receiving device 14.

Delay section 10 includes an input terminal 20, first and second control terminals 22 and 24, respectively, and first and second output terminals 26 and 28, respectively. Input terminal 20 is connected to the cathode of a first diode 30 having its anode connected to a junction terminal 31 which is, in turn, connected to one end of a first storage capacitor 32 and to the cathode of a second diode 34. A second end of first capacitor 32 is connected to first control terminal 22, while the anode of second diode 34 is connected to first output terminal 26 and to one end of an inductor 36. The other end of inductor 36 is, in turn, connected to second output terminal 28 and to one end of a second storage capacitor 38, the other end of second capacitor 38 being connected to second control terminal 24.

Input terminal 20 of delay section 10 is connected to a first output terminal 40 of information signal source 12, a second output terminal 42 of source 12 being grounded. Control terminals 22 and 24 of delay section 10 are connected to first and second output terminals 44 and 46, respectively, of a drive signal source 48.

Second output terminal 28 of delay section 10 is connected to an input terminal 64 of signal receiving device 14 and to the cathode of a diode 50. The anode of diode 50 is, in turn, connected through an inductive or resistive impedance 51 to an output terminal 52 of a terminating voltage source 54 which has an input terminal 55 connected to first output terminal 44 of drive signal source 48.

The basic delay section shown in Fig. 1 may be operated in any one of several slightly different modes, depending upon the potential which is applied to control terminal 24. Accordingly, it will be assumed first, for purposes of illustration, that first output terminal 46 of drive signal source 48 is grounded thereby grounding second control terminal 24.

Figure 2:
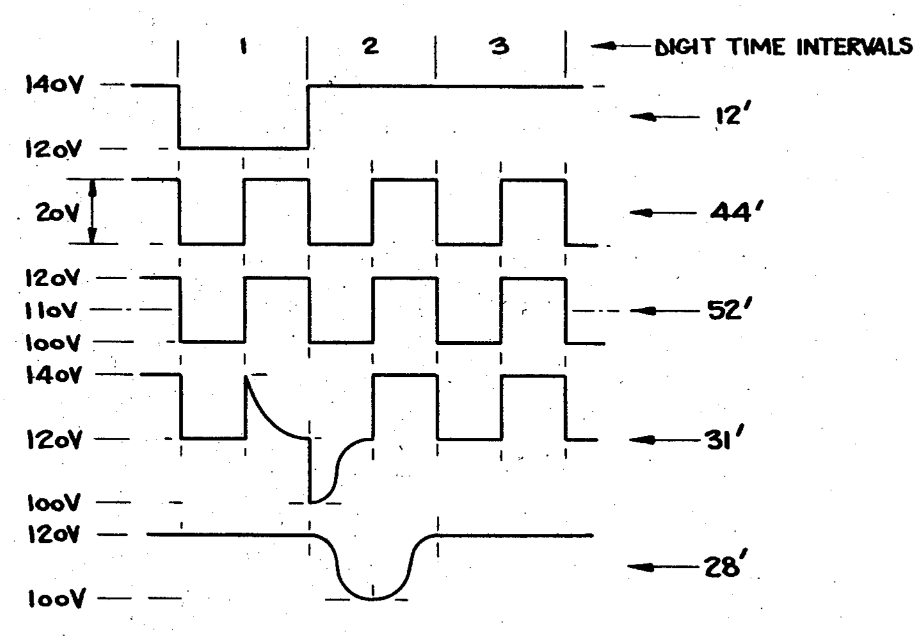
Fig. 2 is a composite diagram of the waveforms of electrical signals taken at various points in the circuit of Fig. 1 when the signal stepping device is operated in one mode.

In operation, referring now to Fig. 2 there is illustrated a composite diagram of the waveforms of the signals appearing at various points in the circuit of Fig. 1. Information source 12 produces a digital information signal, generally designated 12' and including alternate relatively high and low level voltages, which is to be transferred, after a predetermined delay, to receiving device 14. By way of example, signal 12' includes a low level voltage of 120 volts during a first digit time interval, and a high level voltage of 140 volts during succeeding second and third time intervals, as shown in Fig. 2. The high and low levels of signal 12' may, for example, represent the 0 and 1 digits, respectively, of the binary system of numbers. Preferably, the output voltage levels of information source 12 are clamped, in any conventional manner, so as to maintain the levels constant under varying load conditions. However, as will become apparent from the description that follows, in most applications of the present invention the upper voltage level of signal 12' need not be clamped.

Drive signal source 48 produces a continuous square-wave signal, generally designated 44', at first output terminal 44. Signal 44' is of such frequency and phasing, with respect to signal 12', that relatively low and high voltages appear during the first and last halves, respectively, of each digit time interval, as shown in Fig. 2. Source 48 is preferably clamped, in any conventional manner, in order to maintain a selected voltage difference between the levels of signal 44', such as 20 volts, as shown Fig. 2.

Terminating voltage source 54 produces a continuous square wave signal, generally designated 52', at output terminal 52. The frequency and phase of signal 52' are identical to those of signal 44', which is applied to input terminal 55 of terminating voltage source 54. In addition, the voltage variation between the relatively high and low level voltages of signal 52' is substantially identical with that of signal 44'. The only significant difference between signals 44' and 52' is that signal 52' is maintained at a constant average direct-current voltage level, which is shown, by way of example, to be 110 volts in Fig. 2. Thus, signal 52' has alternately high and low level voltages of 120 volts and 100 volts, respectively.

Assume now that prior to the first digit time interval signal 12' is at its high voltage level, as shown in Fig. 2, and that signal 44' is varying between its high and low voltage levels. Owing to the capacitive coupling between junction terminal 31 and first control terminal 22 of delay section 10, signal 31', appearing at junction terminal 31, will vary between relatively high and low voltage levels, as shown in Fig. 2, in accordance with the voltage swings of signal 44'. It should be noted that if signal 44' tends to raise the potential at junction terminal 31 above the potential at input terminal 20, diode 30 will become conductive and prevent a further voltage rise. On the other hand, if the potential at junction terminal 31 falls below the high voltage level of signal 12', diode 30 will be back-biased and will not affect the potential at the junction terminal. Accordingly, with the assumed conditions of a 140-volt high voltage level for signal 12' and a 20-volt swing for signal 44', signal 31' will vary alternately between a low level voltage of 120 volts and a high level voltage of 140 volts.

Consider now the potential of the signal, generally designated 28' in Fig. 2, appearing at second output terminal 28 of delay section 10, or in other words, the potential of the signal appearing across second capacitor 38. It will be noted, from Fig. 1, that the charging path for second capacitor 38 is through diode 50 and terminating voltage source 54, and that the discharge path for capacitor 38 is through second diode 34 and first capacitor 32. Accordingly, the charging potential applied to capacitor 38 is determined by the high potential level of 120 volts of signal 52', because of the unidirectional current characteristic of diode 50. Since the low potential level of signal 31' is similarly 120 volts, it is apparent that prior to the first digit time interval diode 34 will prevent any discharge of capacitor 38 and signal 28' will, therefore, attain a quiescent value of 120 volts. It is clear that in order to obtain such an ideal, the back impedances of diodes 34 and 50 would have to be infinite. In practice, however, the extremely high back impedance of several hundred kilohms is sufficient to prevent any substantial charging or discharging of second capacitor 38 through the diodes prior to the entry of digital signals into delay section 10.

In order to describe the operation of delay section 10, it will now be assumed that a signal corresponding to the binary value 1 is to be applied at input terminal 20 during the first digit time interval. As shown in Fig. 2, the potential of signal 12', which is applied to terminal 20, swings to the low level voltage of 120 volts, corresponding to the binary value 1. At substantially the same time, signal 44' drops to its low level voltage, thereby lowering the potential of signal 31' to its low level voltage of 120 volts. Accordingly, first diode 30 remains nonconducting, since the potentials on its anode and cathode are the same.

This voltage condition exists for approximately one half of the first digit time interval, at the end of which period signal 44' again swings to its high level voltage, thereby instantaneously raising the potential of junction terminal 31 to 140 volts, as shown by signal 31' in Fig. 2. Since signal 12' is still at its 120 volt low level, first diode 30 is now front-biased, thereby completing a relatively low impedance discharge path for first capacitor 32. Accordingly, first capacitor 32 discharges to substantially 120 volts through first diode 30 and the output impedance of information signal source 12. It should be pointed out that the output impedance of source 12 is such that excessive discharge current from capacitor 32 is prevented while still ensuring that the potential of junction terminal 31 has fallen to 120 volts within one half of a digit time interval.

For purposes of clarity, it will be assumed that electrical signals corresponding to the binary value 0 will be applied to input terminal 20 of delay section 10 during the succeeding digit time intervals. Accordingly, as shown in Fig. 2, signal 12' returns to its high voltage level of 140 volts at the end of the first digit time interval, or stated differently, at the beginning of the second digit time interval.

At the start of the second digit time interval, signal 44' again swings to its low potential level. Since the potential across first capacitor 32 cannot be changed instantaneously, the potential of junction terminal 31, as illustrated by signal 31', must also change in accordance with the change in signal 44'. Thus, the potential of junction terminal 31, which had been lowered to 120 volts by the discharge of first capacitor 32 during the last half of the first digit time interval, is instantaneously lowered to 100 volts.

It is immediately apparent that second diode 34 is front-biased as soon as the potential of junction terminal 31 decreases below 120 volts, since, as previously set forth, the potential across second capacitor 38, as exemplified by signal 28', has been maintained substantially constant at 120 volts. Accordingly, second capacitor 38 discharges through inductor 36 and second diode 34 into first capacitor 32 during the first half of the second digit time interval.

During the discharge period of second capacitor 38, the combination of capacitor 38, inductor 36, second diode 34 and first capacitor 32 coact to produce the ringing effect of a high-Q, R–L–C– circuit. Since the forward impedance of second diode 34 is negligibly small, there is an almost complete differential charge transfer between capacitors 38 and 32 as capacitor 38 is discharged. Accordingly, whereas at the start of the second digit time interval the potentials of signals 28' and 31' were 120 volts and 100 volts, respectively, the discharge of second capacitor 38 into first capacitor 32 substantially reverses these potentials, leaving the potentials of signals 28' and 31' at 100 volts and 120 volts, respectively.

After the ringing action of capacitors 32 and 38 and inductor 36 has completed the differential charge transfer from second capacitor 38 to first capacitor 32, further ringing, or in other words, any reverse charge transfer from first capacitor 32 to second capacitor 38, is prevented by diode 34, which is back-biased when the current in the ringing circuit attempts to reverse itself. Accordingly, charge is transferred only from second capacitor 38 to first capacitor 32, the very significant diode back impedance of several hundred kilohms suppressing any tendency of inductor 36 and capacitors 32 and 38 to continue ringing.

The values of capacitance and inductance selected for capacitors 32 and 38 and inductor 36, respectively, are such that their resonant or ringing frequency is equal to or slightly higher than the output signal frequency from drive source 48, as exemplified by signal 44'. Moreover, the capacitances of capacitors 32 and 38 are substantially equal. In this manner, substantially complete differential charge transfer from second capacitor 38 to first capacitor 32 is ensured before signal 44' again swings to its high level potential midway in the second digit time interval.

When signal 44' is raised to its high level potential during the second digit time interval, the terminating voltage potential at output terminal 52 of terminating voltage source 54 is raised accordingly to its high level potential of 120 volts, as shown by signal 52' in Fig. 2. It is apparent, therefore, that diode 50 is front-biased at this time by the 20 volt differential voltage which exists between the potential at terminal 52 of terminating voltage source 54, and the potential across second capacitor 38 which had previously been discharged into first capacitor 32.

Accordingly, second capacitor 38 will be recharged to 120 volts from terminating voltage source 54 and through front-biased diode 50. The values of the specific parameters in the charging circuit, that is of second capacitor 38, diode 50, impedance 51, and the output impedance of source 54, are selected so that second capacitor 38 is substantially completely recharged to its 120 volt signal level within one half a digit time interval. Accordingly, before signal 52' again swings to its low level voltage of 100 volts at the start of the third digit time interval, signal 28' has returned to its quiescent level of 120 volts.

It may be seen from the foregoing description that a change in the voltage level of signal 12' during the first digit time interval has produced a corresponding change in the voltage level of signal 28' during the second digit time interval. Thus, signal 28', as shown in Fig. 2, represents the binary value 1 in the second digit time interval, and the binary value 0 in the first and third digit time intervals.

Signal 28' is applied to input terminal 64 of signal receiving device 14 which may include any of numerous electronic circuits responsive to predetermined amplitude variations in signal 28'. A more specific form of a signal receiving device which may be employed with the shifting registers or delay lines of the present invention will be disclosed later in connection with the description of Fig. 5.

The description of Fig. 1 has thus far been confined to the operation of delay section 10 with second control terminal 24 grounded and terminating voltage source 54 coupled through diode 50 to output terminal 28. However, delay section 10 may also be operated with the cathode of diode 50 connected to output terminal 26 instead of output terminal 28. When this is done, the operation of delay section 10 is similar to the operational sequence previously described, with the exception that second capacitor 38 attempts to recharge through inductor 36 to 140 volts during the second half of the second time interval.

Considering the mode of operation more specifically, it can be seen that the combination of capacitor 38 and inductor 36, which is now in the charging circuit of capacitor 38, tends to ring or resonate into terminating voltage source 54. Thus, the potential of second capacitor 38, which at the start of the second half of the second digit time interval is 20 volts less than the potential of signal 52', will attempt to swing positive until it is substantially 20 volts more than the potential of signal 52'. However, it may be recalled that the ringing frequency of the charging circuit for first capacitor 32 was slightly higher than the frequency of signal 44'. Therefore, since the capacitance of the charging circuit for second capacitor 38 is twice the capacitance of the charging circuit for capacitor 32, the ringing frequency of the charging circuit of capacitor 38 is one half the frequency of signal 44'. Accordingly, although the potential of second capacitor 38 is rising exponentially toward 140 volts during the second half of the second digit time interval, it attains approximately only 120 volts at the start of the third digit time interval. At this time, signal 52' again assumes it low potential value of 100 volts thereby effectively stopping the recharging of capacitor 38 at 120 volts.

Although delay section 10 may, therefore, be operated with the terminating voltage applied to either output terminal 28 or output terminal 26, it is clear that the waveform of output signal 28' will be similar for either case.

It was stated earlier that delay section 10 may be operated in slightly different modes by applying different potentials to second control terminal 24. In the foregoing description, it was assumed that second control terminal 24 was connected to ground through drive signal source 48. Another mode of operation for delay section 10, wherein a varying potential is applied to terminal 24, will now be described with reference to Fig. 3.

Figure 3:
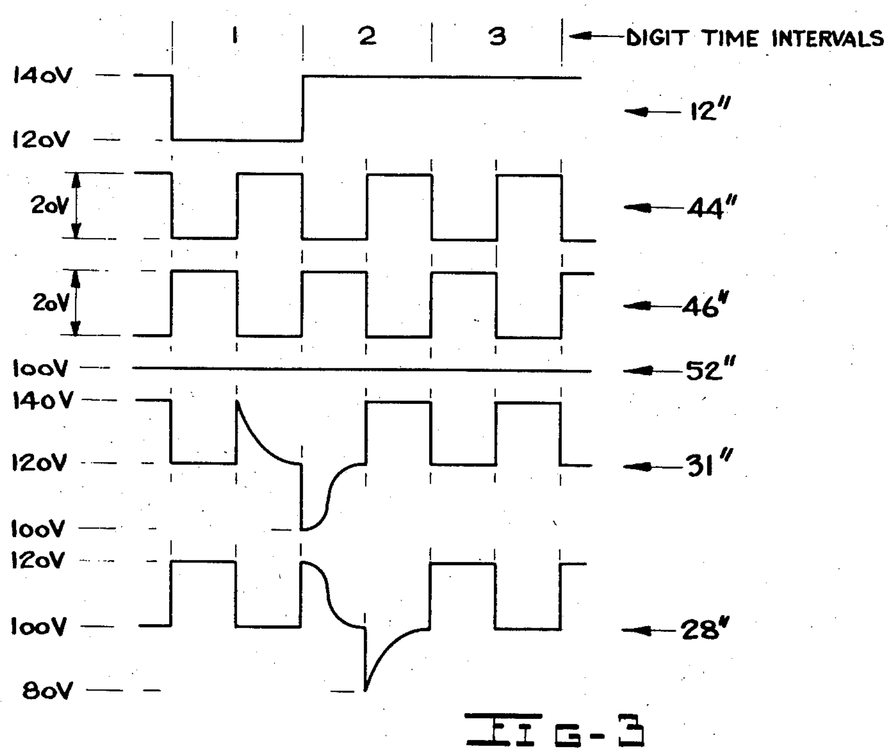
Fig. 3 is a composite diagram of the waveforms of electrical signals taken at various points in the circuit of Fig. 1 when the signal stepping device is operated in another mode.

Referring now to Fig. 3, it will be noted that signals 12'', 44'' and 31'', taken at input terminal 20, first control terminal 22 and junction terminal 31, respectively, are identical to signals 12', 44' and 31', respectively, of Fig. 2. However, a signal 46'' taken at second output terminal 46 of drive signal source 48 and of squarewave configuration complementary to that of signal 44'', is applied to second control terminal 24. Under these conditions, the potential at second output terminal 28 will vary in amplitude and phase with the changes in potential level of signal 46''.

Consider now the potential applied to delay section 10 by terminating voltage source 54. With second control terminal 24 grounded. the function of the terminating potential is threefold, namely, to provide a potential for recharging second capacitor 38, to clamp the normal voltage level at output terminal 28 so that capacitor 38 will discharge into capacitor 32 only when the potential at junction terminal 31 is driven below its normal low voltage level, and to preclude capacitor 32 from recharging from the terminating potential source. The last-named function was accomplished by driving the terminating potential to a low level value of 100 volts during the discharge of capacitor 38 into capacitor 32. However, when signal 46'' is impressed on control terminal 24, the periodic low level excursion of signal 28'' will prevent capacitor 32 from recharging from the terminating voltage source. Accordingly, a constant direct-current voltage may be generated at output terminal 52 of terminating voltage source 54 for clamping the low level value of signal 28'' and for providing a recharging potential for capacitor 38.

Assume again that the potential values of signals 12'', 44'' and 31'' are the same as those values previously assumed for signals 12', 44' and 31', respectively. Since the potential of signal 31'' is at its low level value of 120 volts when signal 28'' is at its high voltage level, the clamping action of diode 34 will clamp the high voltage level of signal 28'' at 120 volts. Under these conditions, with a terminating direct-current voltage of 100 volts, as shown by signal 52'', and assuming a 20 volt swing between the high and low voltage levels of signal 46'', signal 28'', prior to the first digit time interval, will alternately vary between high and low voltage levels of 120 volts and 100 volts, respectively.

In operation, when a low level signal corresponding to the binary value 1 is applied at input terminal 20, delay section 10 functions as shown in Fig. 2 during the first digit time interval, and the signals appearing at the various points in the circuit during this interval, therefore, need no further description. At the start of the second digit time interval, signal 31'' is lowered instantaneously to 100 volts in accordance with the change in voltage level of signal 44'', while signal 28'' is raised instantaneously to 120 volts, in accordance with the change in voltage level of signal 46''. Second diode 34 is now front-biased and a differential charge transfer occurs from second capacitor 38 to first capacitor 32 due to the ringing action of capacitors 32 and 38 and inductor 36.

When the differential charge transfer is completed and signal 31'' has risen to 120 volts while signal 28'' has fallen to 100 volts, further ringing is prevented by the high impedance of diode 34 which becomes back-biased when the ringing transient current attempts to reverse itself. At substantially the same instant, or, in other words, midway in the second digit time interval, signals 44'' and 46'' again change their respective voltage levels, thereby raising the potential of junction terminal 31 to 140 volts and lowering the potential at second output terminal 28 to 80 volts.

It is immediately apparent that diode 50 is now front-biased by the 20-volt differential voltage which exists between second output terminal 28 of delay section 10 and output terminal 52 of terminating voltage source 54. Accordingly, second capacitor 38 will recharge exponentially to 100 volts through diode 50 and impedance 51, the time constant of this charging circuit being such that capacitor 38 has substantially completed its charging cycle prior to the succeeding variation in the voltage levels of signals 44″ and 46″ at the start of the third digit time interval.

Since signal 28″ is applied to input terminal 64 of signal receiving device 14, it is clear that the voltage excursion of 20 volts in signal 28″ may be utilized for actuating electronic signal responsive circuits within receiving device 14 at a time displacement of one and one half digit time intervals from the time of entry of an information signal into delay section 10.

Thus, it may be seen that delay section 10 may be utilized for producing an output signal delayed either one or one and one half digit time intervals after an information signal has been applied to input terminal 20. It is to be understood, of course, that delay section 10 may be structurally altered by those skilled in the art in order to provide delay sections which are structurally and functionally equivalent to delay section 10. One of these modifications will now be described.

Figure 4:
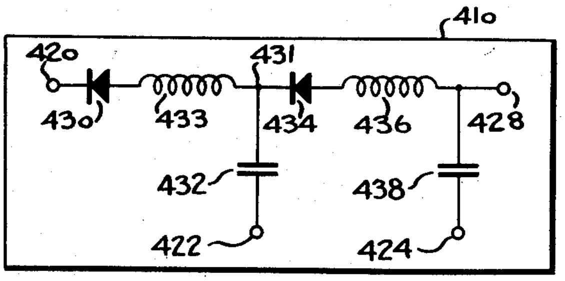
Fig. 4 is a schematic diagram of a modified signal stepping device, according to the present invention.

Referring now to Fig. 4, there is shown a delay section 410 which includes an input terminal 420, first and second control terminals 422 and 424, respectively, and an output terminal 428. Input terminal 420 is connected to the cathode of a first diode 430 whose anode is connected to one end of an inductor 433. The other end of inductor 433 is, in turn, connected to a junction terminal 431.

Terminal 431 is connected to one end of a first storage capacitor 432 and to the cathode of a second diode 434, the other end of capacitor 432 being connected to first control terminal 422. The anode of diode 434 is connected to one end of an inductor 436, the other end of inductor 436 being connected to output terminal 428, and to one end of a second storage capacitor 438 whose other end is connected to second control terminal 424.

In operation, the waveforms and operational characteristics of delay section 410 are substantially identical with those described for delay section 10, assuming, of course, that the signals applied to the terminals of delay section 10 are applied to corresponding terminals of delay section 410. The equivalence of delay section 410 to delay section 10 is more easily recognized by the similarity of the charging paths of first storage capacitors 32 and 432, each of which includes a diode, an inductor and a second storage capacitor. In other words, in the delay sections of both Fig. 1 and Fig. 4, the first and second storage capacitors are interconnected by an associated inductor and diode.

If the values selected for capacitors 432 and 438 and each of inductors 433 and 436 are the same as the values of capacitors 32 and 38 and inductors 36, respectively, the only appreciable difference between the waveforms for delay section 410 and those of delay section 10 will be in the shape of the electrical discharge transient for capacitor 432 as compared with that of capacitor 32. This is obviously caused by the inclusion of inductor 433 in the discharge path of capacitor 432. Accordingly, if the inductive reactance of the source of information signals used in Fig. 1 is substantially equal to the reactance of inductor 433, the discharge transients of capacitors 32 and 432 in Figs. 1 and 4, respectively, may be made substantially the same.

From the foregoing description of Figs. 1 and 4, it may be seen that the delay sections of the present invention operate to sequentially step or shift an electrical charge, corresponding to an applied electrical information signal, by the controlled sequential discharge and charge of capacitors. In addition, it is also clear that the delay interval per section is a function of the frequency and potential of the drive signals applied at the associated control terminals of the delay sections.

Stated differently, the delay sections of the present invention are operable, under the control of an applied periodic drive signal, to sequentially transfer charge firstly between a first storage capacitor and a source of intelligence signals, secondly between the first storage capacitor and a second storage capacitor, and thirdly between the second storage capacitor and a source of terminating voltage.

The delay sections of the present invention may be utilized for performing numerous electrical functions as delay lines or shifting registers by merely cascading a plurality of individual delay sections, such as delay section 10 or delay section 410. When a number of delay sections, such as delay section 10 of Fig. 1, are to be serially connected, the input terminal 20 of each section is connected to the output terminal 26 of the preceding delay section. For example, if N delay sections are to be cascaded, the input terminal of sections 2, 3, . . . $(N-1)$, N are connected to output terminal 26 of sections 1, 2, . . . $(N-1)$, respectively, the input terminal of section 1 is connected to the information signal source, and output terminal 28 of section N is connected to the signal receiving device. In this manner, electrical signals corresponding to binary coded intelligence information may be sequentially shifted through any predetermined delay interval.

On the other hand, if N delay sections of the structure shown in Fig. 4 are to be cascaded, it is merely necessary to connect the input terminal of each stage to the output terminal of the immediately preceding stage. Again, as described for section 10 of Fig. 1, the input terminal of the 1st section and the output terminal of the Nth section are utilized for receiving an applied input signal and for producing a delayed output signal, respectively.

The application of the delay sections of the present invention to shifting registers will now be described in detail with reference to Fig. 5. In this figure there is shown a shifting register, generally designated 500, which includes three cascaded delay sections **510*a*, 510*b* and 510*c*, respectively, for applying electrical signals from a source 512 of electrical digital information signals to an electrical signal receiving device 514**.

Information signal source 512 includes an output terminal 540 which is connected to an input terminal **520*a* of delay section 510*a*. Source 512 may be any conventional electronic device suitable for generating electrical signals having relatively high and low voltage levels corresponding to binary coded information. As shown in Fig. 5, for example, source 512 includes a bistable multivibrator or flip-flop 513 having two trigger sections, the output terminal of one trigger section being coupled through an impedance 515 to output terminal 540. Flip-flop 513** also includes a ground return connection, not shown.

Signal receiving device 514 includes an input terminal 564 which is connected to an output terminal **528*c* of section 510*c* of the shifting register. The signal receiving device may include any conventional electronic signal-responsive circuit which is operable in response to electrical signals of predetermined amplitude for performing electrical functions. As shown in Fig. 5, for example, receiving device 514 includes a flip-flop 517 having a first input terminal coupled through a signal clipping circuit 519 to input terminal 564, and a second input terminal connected to a source 521 of periodically-recurring clock pulses. Flip-flop 517 may also include at least one output terminal, which is designated in Fig. 5 by the arrow 523**.

The associated electrical circuits of shifting register 500 also include a drive signal generator 548 and a terminating voltage source 554. Drive signal generator 548 includes two output terminals 544 and 546, respectively. Output terminal 544 is connected by a bus 525 to three first control terminals 522*a*, 522*b* and 522*c* of delay sections 510*a*, 510*b* and 510*c*, respectively, while output terminal 546 is connected by a bus 526 to three second control terminals 524*a*, 524*b* and 524*c* of delay sections 510*a*, 510*b* and 510*c*, respectively.

Drive signal generator 548 may include any conventional source of continuous squarewave electrical signals having a period equal to one digit time interval for information signal source 512. As shown in Fig. 5, for example, source 548 may include a flip-flop 527 having two conduction sections, the output end of one section being coupled to output terminal 544 by a first amplifier 529, and the output end of the other section being coupled to a first contact 533 of a switch, generally designated 535 by a second amplifier 536. Switch 535 also includes an armature 537 which is connected to output terminal 546 of drive signal source 548, and a second contact 539 which is grounded.

Terminating voltage source 554 includes two input terminals 555 and 556 connected to output terminals 544 and 546, respectively, of drive signal generator 548, and an output terminal 552 coupled through an impedance 551 to the anode of a diode 550, the cathode of diode 550 being connected to output terminal 528*c* of shifting register 500. The specific structure which may comprise terminating voltage source 554 will be described in detail below when the effect on register 500 of amplitude variations in the signal output from drive signal source 548 is described.

The operation of register 500 will now be described with reference to Fig. 6, which illustrates composite waveforms of electrical signals taken at various points in the circuit of Fig. 5 when armature 537 of switch 535 is engaging second contact 539, thereby grounding second control terminals 524*a*, 524*b* and 524*c*.

Information source 512 produces a digital information signal, generally designated 512′ and including alternate high and low voltage levels, which is to be transferred, after a predetermined delay of three digit time intervals, to receiving device 514. By way of example, signal 512′ includes a low level voltage of 120 volts during the first digit time interval and a high level voltage of 150 volts during succeeding digit time intervals. The high and low levels of signal 512′ may, for example, represent the binary values of 0 and 1, respectively. As will be more clearly understood later when the amplitudes of the voltage levels of the information signal, drive signal and terminating voltage are correlated, the amplitude of the high level voltage of the applied intelligence signal may have any arbitrary value, provided this value is greater than the sum of the amplitude of the low level voltage of the applied intelligence signal and the amplitude of the voltage swing of the squarewave drive signal.

Drive signal generator 548 produces a continuous square-wave signal, generally designated 544′, at output terminal 544, the period of signal 544′ being equal to one digit time interval. In addition, signal 544′ is phased to present relatively low and high voltages during each digit time interval, as shown in Fig. 6. The voltage swing between the high and low level values of signal 544′ may be any preselected voltage difference, such as 20 volts, for example, as shown in Fig. 6.

The selection of the terminating voltage which is applied to terminating voltage source 554 is determined by three factors. Firstly, the mode of operation of the shifting register must be considered, that is, whether second control terminals 524*a*, 524*b*, 524*c*, are grounded or receive a squarewave signal complementary to signal 544′. Secondly, the number of delay sections included in shifting register 500 must be taken into account, and thirdly the amplitude of the voltage swing of signal 544′ and the low level voltage of information signal 512′ must be considered.

As may be recalled from the description of Fig. 1 when the second control terminal was grounded, the teminating voltage applied to one delay section had a differential voltage swing between high and low voltage levels equal to the voltage difference between high and low voltage levels of the signal presented by the drive signal source. In addition, it may be recalled that when a single delay section is utilized, the high voltage level of the terminating potential applied was equal to the low voltage level of the signal applied to the input terminal of the section. Accordingly, in order to determine the proper terminating voltage for a shifting register comprising a plurality of delay sections, the above considerations for one delay section must be applied to each of the delay sections in the shifting register. This results in the following equation:

$$E_{ta}=E_{il}-N\Delta Q+\frac{\Delta Q}{2} \quad (1)$$

or $$E_{ta}=E_{il}-\Delta Q(N-\tfrac{1}{2}) \quad (2)$$

where $E_{ta}$=average value of terminating potential
$E_{il}$=low level voltage of information signal
$N$=number of cascaded delay sections
$\Delta Q$=differential voltage between high and low voltage levels of drive signal By inserting the values selected for signals 544′ and 512′ in Equation 2, it is clear that the average value of the terminating potential which should be presented by terminating voltage source 544 is $$E_{ta}=120-(20)(3-\tfrac{1}{2})=70$$

Accordingly, the high and low level values of the output signal from terminating voltage source 554 will be 80 volts and 60 volts, respectively, the differential amplitude of 20 volts corresponding to the voltage difference between the high and low level voltages of drive signal 544′. The output signal from terminating voltage source 544 is shown in Fig. 6 by the waveform generally designated 552′.

Figure 6:
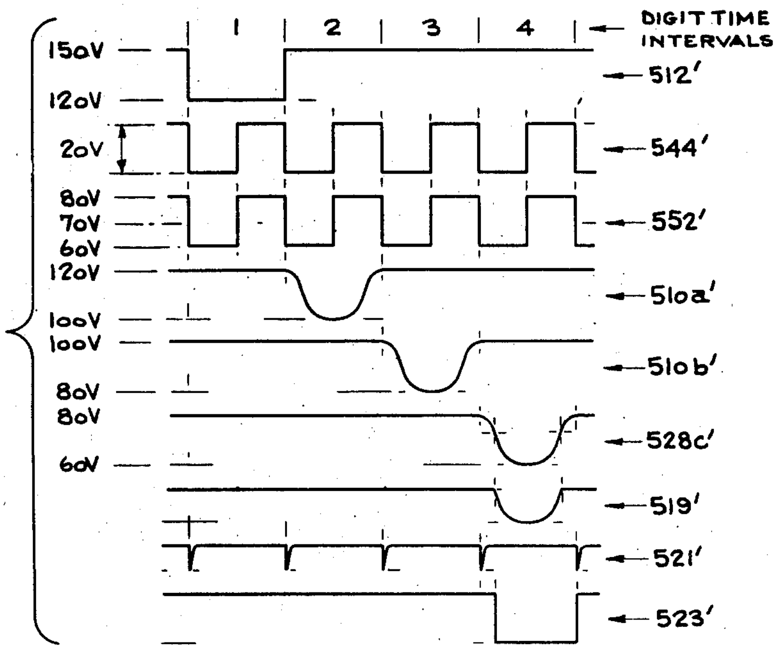
Fig. 6 is a composite diagram of the waveforms of electrical signals taken at various points in the circuit of Fig. 5 when the shifting register is operated in one mode.

Assume now that prior to the first digit time interval, signal 512′ is at its high voltage level, as shown in Fig. 6, and that signals 544′ and 552′ are varying between their high and low voltage levels. It follows then, from the description of Fig. 1, that the output signals presented by delay sections 510*a*, 510*b* and 510*c* will have values of 120 volts, 100 volts, and 80 volts, respectively, as illustrated in Fig. 6 by the waveforms designated 510*a*′, 510*b*′ and 528*c*′, respectively.

In order to describe the operation of shifting register 500, it will now be assumed that a signal corresponding to the binary value 1 is applied to input terminal 520*a* of shifting register 500 during the first digit time interval. As shown in Fig. 6, signal 512′ swings to its low level voltage during this interval.

Signal 544′ then steps or shifts the input information signal through the passive elements of each of delay sections 510*a*, 510*b* and 510*c* in the manner described for Figs. 1 and 2, the output signal from each of these three sections presenting a voltage drop of 20 volts in the second, third and fourth digit time intervals, respectively, corresponding to the applied information signal delayed one, two, and three digit time intervals, respectively. The output signal waveforms for delay sections 510*a*, 510*b* and 510*c* are illustrated in Fig. 6 by signals 510*a*′, 510*b*′ and 528*c*′, respectively.

Output signal 528*c*′ from shifting register 500 is then clipped in signal receiving device 514 by signal clipping circuit 519 in order to discriminate between the voltage change which corresponds to the delayed information signal and minor fluctuations in potential which may be caused by transient currents in the shifting register. The output signal from signal clipping circuit 519, as illustrated in Fig. 6 by signal 519′, is then applied to flip-flop 517.

Flip-flop 517, which, prior to the fourth digit time interval, has been maintained in one conduction state by the application of clock pulses from clock pulse source 521 at the beginning of each digit time interval, will be triggered to the other conduction state during the first half of the fourth digit time interval by the application of signal 519′.

Accordingly, during the fourth digit time interval, flip flop 517 will present an output signal corresponding to the information signal applied at input terminal **510*a* of shifting register 500 during the first digit time interval. The waveforms of the clock pulses applied to flip-flop 517 and of the output signal presented at output terminal 523 of flip-flop 517 are illustrated in Fig. 6 by signal waveforms 521′ and 523′**, respectively.

In the operational description of shifting register 500 thus far presented, it has been assumed that the potential difference between the high and low voltage levels of drive signal 544′ remained constant at 20 volts, while the average value of terminating signal 552′ remained constant at 70 volts.

Assume now, however, that the differential voltage swing (ΔQ) of signal 544′ changes to 18 volts. From Equation 2 it is immediately apparent that to provide a proper terminating potential for shifting register 500, the average value of the terminating voltage should be 75 volts. The reason for this rise in the required average terminating potential is more clearly understood when it is realized that the difference between the values of the low level voltages at the input and output ends of each delay section is equal to the amplitude of the voltage swing (ΔQ) of signal 544′. For example, if ΔQ is 18 volts, signal **510*a*′ will vary between 120 volts and 102 volts, signal 510*b*′ will vary between 102 volts and 84 volts, and signal 528*c*′ will vary between 84 volts and 66 volts. Accordingly, if the potential values of terminating signal 552′ were to remain unchanged, that is, high and low potentials of 80 volts and 60 volts, respectively, the amplitude of the signal applied to signal receiving device 514** would be equal to 80−66 or 14 volts instead of 20 volts as described for the condition when ΔQ was equal to 20 volts.

It is clear, therefore, that in order to provide a proper terminating potential when the magnitude of ΔQ changes, the voltage presented at output terminal 552 of terminating voltage source 554 should vary in accordance with the relationship defined in Equation 2.

Referring again to Fig. 5, there is shown one combination of well known circuit elements which may comprise terminating voltage source 554 in order to provide a terminating potential which is variable in accordance with amplitude variations in ΔQ. As illustrated in Fig. 5, terminating voltage source 554 includes a voltage multiplier circuit 557 connected to input terminal 555, and a cathode follower circuit 559 interconnecting voltage multiplier circuit 557 and output terminal 552 of the terminating voltage source.

Voltage multiplier circuit 557 includes a plurality of voltage multiplying networks corresponding in number to the number of delay sections which are included in the associated shifting register. Thus as shown in Fig. 5, the voltage multiplier circuit includes three similar voltage multiplier networks designated **560*a*, 560*b* and 560*c*, respectively, and corresponding to delay sections 510*a*, 510*b* and 510*c*, respectively, in shifting register 500**.

Voltage multiplier network **560*a* includes a storage capacitor 563*a* having one terminal connected to input terminal 556 and a second terminal coupled to input terminal 555 through a series combination of a first diode 565*a* and a coupling capacitor 567*a*. The junction of diode 565*a* and coupling capacitor 567*a* is, in turn, coupled to the E terminal of a source of direct-current potential, not shown, by a second diode 569*a*. Voltage multiplier networks 560*b* and 560*c*** include similar components which are designated by the suffix letters *b* and *c*, respectively, the cathodes of diodes **569*b* and 569*c* being respectively connected to the junction of storage capacitor 563*a* and first diode 565*a*, and the junction of storage capacitor 563*b* and first diode 565*b***.

Voltage multiplier circuit 557 also includes a switch, generally designated 571, having a first contact 573 connected to the junction of first diode **565*c* and storage capacitor 563*c* in voltage multiplier network 560*c*, and a second contact 575 connected to the junction of coupling capacitor 567*c* and first diode 565*c*. An armature 577 of switch 571 is connected to an input terminal of cathode follower circuit 559 and is ganged with armature 537 of switch 535 in drive signal source 548, as indicated by dashed line 580**.

In order to describe the operation of terminating voltage source 554, it will be assumed that the potential applied at terminal E in voltage multiplier network **560*a* has a value equal to that of the low voltage level of information signal 512′, or 120 volts. It will also be assumed that the voltage swing ΔQ of signal 544′** is 20 volts.

For this instance, the potential at the junction of first diode **565*a* and capacitor 567*a* will vary between 120 volts and 100 volts, in accordance with the voltage swing of signal 544′, and due to the clamping action of first diode 569*a*. The potential at the junction of storage capacitor 563*a* and first diode 565*a* will then remain constant at 100 volts due to the clamping action of diode 565*a*. In a similar manner, the elements of voltage multiplying networks 560*b* and 560*c* coact to produce a direct-current potential of 60 volts at first contact 573 of switch 571 and a potential varying between 80 volts and 60 volts at second contact 575 of switch 571. Since armature 577 is ganged with armature 537 of switch 535, armature 577 will engage second contact 575 when second control terminals 524*a*, 524*b* and 524*c* of shifting register 500** are grounded.

Cathode follower circuit 559 is interposed between the terminating delay section of shifting register 500 and voltage multiplier circuit 557 in order to provide impedance transformation between drive signal source 548 and the terminating delay section, thereby preventing excessive current drain from source 548. Assuming the voltage gain of the cathode follower to be substantially unity, it is clear that when armature 577 of switch 571 is engaging second contact 575, the potential at output terminal 552 of terminating voltage source 554 will swing between 80 volts and 60 volts in accordance with the amplitude of signal 544′.

Assume now that the swing ΔQ of signal 544′ is decreased to 18 volts. It will be recalled that, according to Equation 2, the proper terminating voltage potential should then have an average value of 75 volts and should swing between high and low level values of 84 volts and 66 volts, respectively. As may be readily recognized from the structure of voltage multiplier circuit 557, the potential at the junction of first diode **565*a* and capacitor 567*a* will vary between high and low levels of 120 volts and 102 volts, respectively, the upper limit of 120 volts being established by the clamping action of second diode 569*a*. It follows then that the potential across storage capacitor 563*a* will be 102 volts due to the clamping action of diode 565*a***.

In a similar manner, it can be shown that the potential at the junction of first diode **565*c* and coupling capacitor 567*c* will vary between high and low level values of 84 volts and 66 volts, respectively. Since the voltage gain of the cathode follower has been assumed to be unity, it is clear that the terminating voltage presented at output terminal 552 of terminating voltage source 554** will also swing between high and low level values of substantially 84 volts and 66 volts, respectively, as desired.

It is thus seen how variations in the differential voltage between high and low levels of signal 544' may be prevented from unduly decreasing the useful amplitude of the signal applied from output terminal 528c of shifting register 500 to signal clipping circuit 519 in signal receiving device 514.

Figure 5:
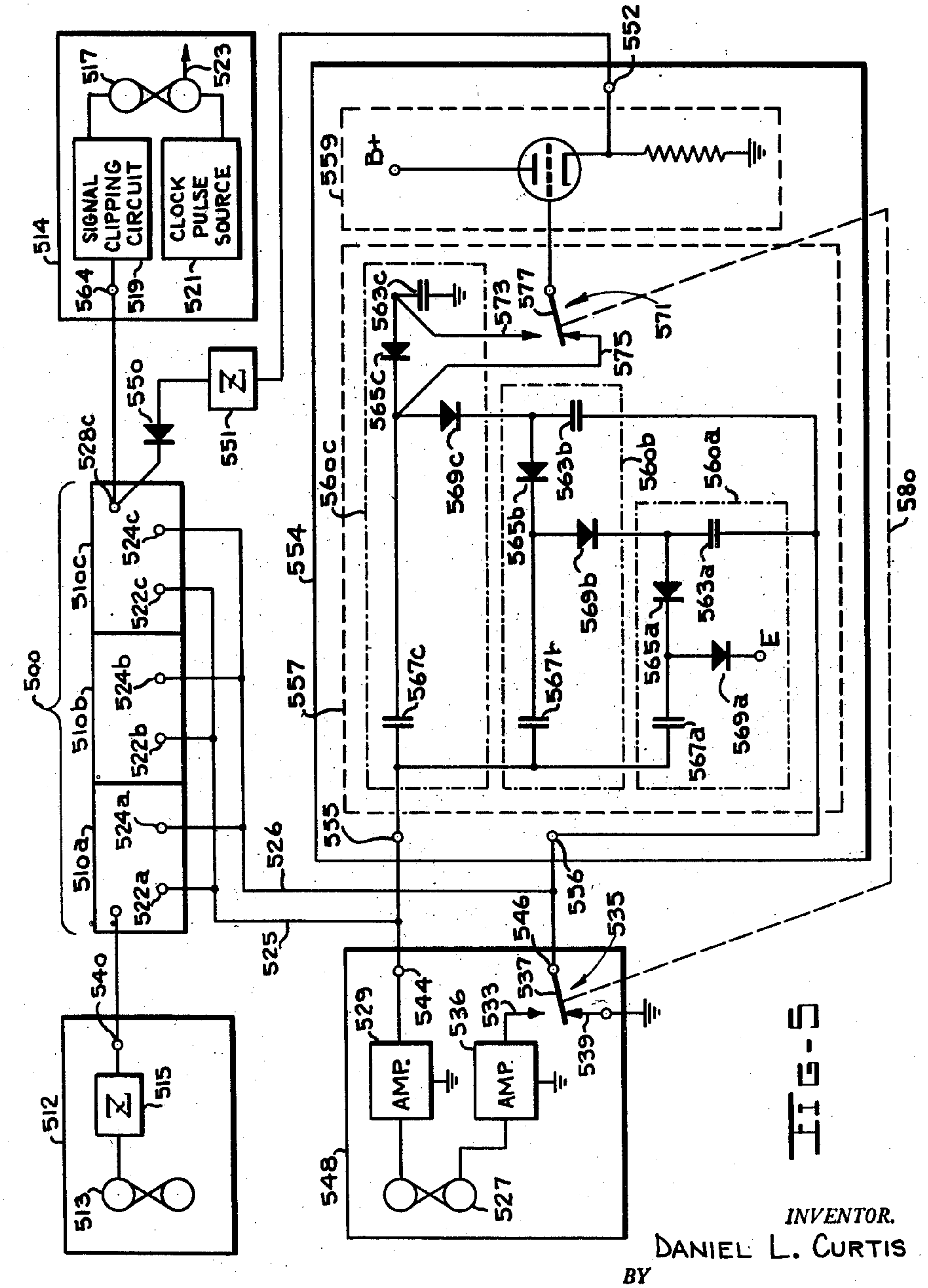
Fig. 5 is a schematic diagram of a shifting register, according to the present invention, including a plurality of cascaded one-section signal stepping devices.

The description of the shifting register shown in Fig. 5 has thus far considered the operation of the shifting register when second control terminals 524a, 524b and 524c are grounded. The operation of shifting register 500 when a squarewave signal is applied to the second control terminals will now be described with reference to Fig. 7 which illustrates composite waveforms taken at various points in the circuit of Fig. 5.

Figure 7:
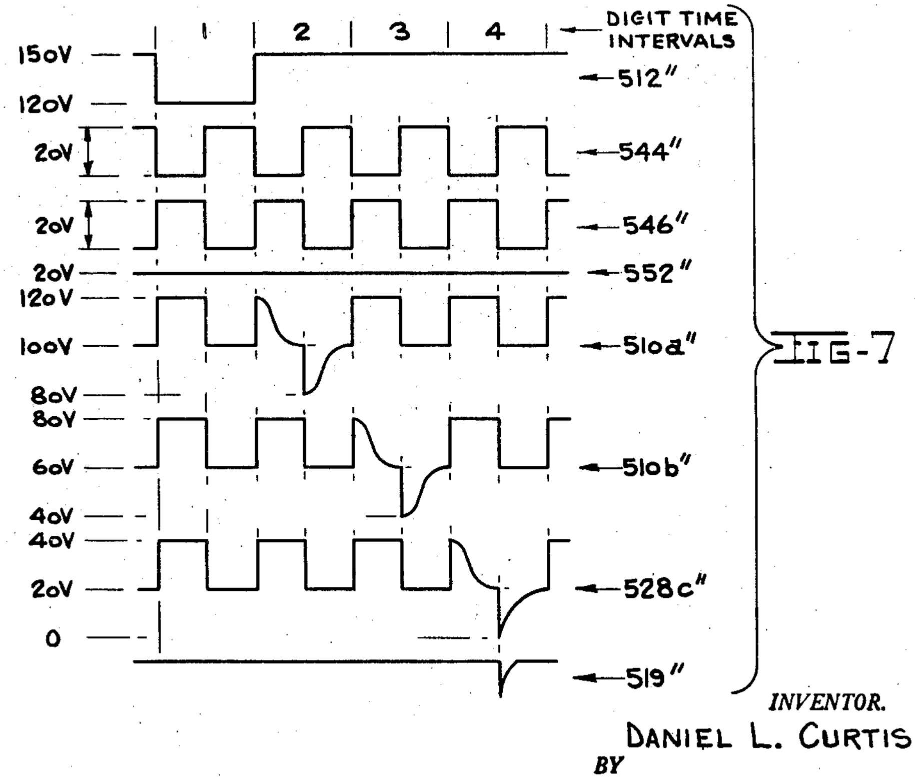
Fig. 7 is a composite diagram of the waveforms of electrical signals taken at various points in the circuit of Fig. 5 when the shifting register is operated in another mode.

Assume now that the waveforms and relative amplitudes of signals 512'' and 544'' of Fig. 7 are identical to the waveforms 512' and 544', respectively, as shown in Fig. 6. In addition it will be assumed that armatures 537 and 577 of switches 535 and 571, respectively, are engaging first contacts 533 and 573, respectively.

The electrical signal which is now applied to second control terminals 524a, and 524b and 524c of shifting register 500 and to capacitors 563a and 563b of voltage multiplier circuit 557 will be the complement of signal 544'', and is illustrated in Fig. 7 by the signal waveform generally designated 546''. It will be noted that the voltage difference between high and low level voltages is equal to the votlage difference (ΔQ) between the high and low level voltages of signal 544''.

As may be recalled from the previous operational description of Fig. 5 for the condition when second control terminals 524a, 524b and 524c were grounded, the selection of the terminating voltage which is to be applied to the shifting register, according to the prevent invention, is made in view of three factors, namely, the mode of operation of the shifting register, the number of delay sections included in the register, and the amplitudes of the voltage swing of the drive signal and the low level voltage of the information signal presented by information source 512.

It may also be recalled from the description of Fig. 1 that when a squarewave signal was applied to the second control terminal of a single delay section, the terminating potential was a direct-current voltage equal in amplitude to the low level voltage of the applied information signal minus the amplitude of the voltage swing ΔQ of the applied drive signal. However, when additional delay sections are cascaded with the first delay section, the potential drop in each of the additional delay sections is equal to twice the voltage swing of the drive signal, since both the first and second control terminals of each section has a squarewave signal applied thereto and the high level voltage of each storage capacitor is determined by the low level voltage of the immediately preceding storage capacitor. Accordingly, in order to determine the proper terminating voltage for a shifting register comprising a plurality of delay sections operated with a squarewave signal applied to their associated second control terminals, the above considerations may be correlated by the following equation:

$$E_t = E_{il} - \Delta Q - 2\Delta Q(N-1) \quad (3)$$

or $$E_t = E_{il} - 2\Delta Q(N-\tfrac{1}{2}) \quad (4)$$

where $E_t$=terminating potential
$E_{il}$=low level voltage of information signal
$N$=number of cascaded delay sections
$\Delta Q$=differential voltage between high and low voltage levels of drive signals.

By inserting the values selected for the low level voltage of information signal 512'' and the amplitude swing of drive signals 544'' and 546'', it is clear that the terminating potential which should be presented by terminating voltage source 544 is $$E_t = 120 - 2(20)(2\tfrac{1}{2}) = 20 \text{ volts}$$

Assume now that the potential applied to terminal E of voltage multiplier network 560a remains constant at the previously selected value of 120 volts. Then the potential at first contact 573 of switch 571 will be 20 volts due to the previously described function of voltage multiplier networks 560a, 560b and 560c in multiplying variations in the drive signal voltage swing ΔQ. Thus, it is seen that the signal appearing at output terminal 552 of terminating voltage source 554, and illustrated in Fig. 7 by the signal generally designated 552'', has the desired potential of 20 volts.

Assume now that prior to the first digit time interval signal 512'' is at its high voltage level, as shown in Fig. 7, and that signals 544'' and 546'' are varying between their high and low voltage levels. It follows then from the description of Fig. 1 taken in connection with Fig. 3, that the output signals presented by delay sections 510a, 510b and 510c will vary periodically in accordance with the voltage swings of signal 546'' and between the high and low voltage levels of 120 volts and 100 volts, 80 volts and 60 volts, and 40 volts and 20 volts, respectively, as illustrated in Fig. 7 by the signal waveforms generally designated 510a'', 510b'' and 528c'', respectively.

In order to describe the operation of shifting register 500 when control terminals 524a, 524b and 524c receive signal 546'', it will now be assumed that a signal corresponding to the binary value 1 is applied to input terminal 520a of shifting register 500 during the first digit time interval. As shown in Fig. 7 signal 512'' swings to its low voltage level during this interval while complementary signals 544'' and 546'' swing low and high, and high and low, respectively, during the first and second halves of the first digit time interval, respectively.

Signals 544'' and 546'' coact to step or shift the applied information signal through the passive elements of each of delay sections 510a, 510b and 510c in the manner described in connection with Figs. 1 and 3, the output signal from each of these three sections presenting a voltage drop of 20 volts below their normal low voltage levels in the second, third and fourth digit time intervals, respectively. The drop in potential of signals 510a'', 510b'' and 528c'' to 80 volts, 40 volts and 0 volts, respectively, corresponds to the applied information signal delayed one and one half, two and one half and three and one half digit time intervals, respectively.

When output signal 528c'' is applied to signal receiving device 514, signal clipping circuit 519 functions to pass only the portion of signal 528c'' which is below 20 volts, thereby producing an electrical output signal for triggering flip-flop midway in the fourth digit time interval. The output signal from signal clipping circuit 519 is illustrated in Fig. 7 by the signal generally designated 519''.

In the foregoing description of Figs. 5 and 7, it has been assumed that the potential difference (ΔQ) between the high and low voltage levels of signals 544'' and 546'' remains constant at 20 volts while the value of terminating signal 552'' remains constant at 20 volts.

Assume now, however, that the differential voltage swing "ΔQ" of signals 544'' and 546'' changes to 22 volts. From Equation 3, it is clear that to provide a proper terminating potential for shifting register 500, the value of the terminating voltage should now be 10 volts. The reason for this decrease in the average terminating potential is more clearly understood when it is realized that the difference between the values of the low level voltages of the electrical signals at the input and output end of each delay section is related to the amplitude of the voltage swing "ΔQ" of signals 544'' and 546''. For example, if ΔQ is 22 volts, signal 510a'' will normally vary between 120 volts and 98 volts, signal 510b'' will normally vary between 76 volts and 54 volts and signal 528c'' will normally vary between 32 volts and 10 volts. Accordingly, if the direct-current potential of terminating signal 552' were to remain at 20 volts, the useful amplitude of the signal applied to signal receiving device 514 would be decreased by 10 volts.

It is clear, therefore, that in order to provide a proper terminating potential when the magnitude of ΔQ changes, the voltage presented at output terminal 552 of terminating voltage source 554 should vary in accordance with the relationship defined in Equation 3.

From the description of voltage multiplier circuit 557 previously presented, it will be recognized that the potential across each of storage capacitors 563a, 563b and 563c is dependent on the magnitude of the drive signal voltage swing. For example, if ΔQ is equal to 22 volts, the potential across capacitor 563a will now vary between 98 volts and 76 volts. Similarly the potential across capacitor 563b will vary between 54 volts and 32 volts, while the potential across capacitor 563c will be $$32-22=10$$

volts which is the desired terminating potential in this instance. Since the voltage gain of cathode follower 559 has been assumed to be substantially unity, it may be seen that terminating voltage source 554 will always present the proper terminating voltage for register 500 at output terminal 552, despite any variations in the differential voltage swing of drive signal 544''.

Although the foregoing description of Fig. 5 illustrates the application of three passive element delay sections in a three binary digit shifting register, according to the present invention, it is clear that any number of delay sections may be serially connected in order to provide shifting registers capable of stepping or shifting an applied information signal through a corresponding number of digit time intervals.

Moreover, it is to be expressly understood that the potential values assigned to the various signals applied to the delay sections of the present invention in the foregoing description are merely illustrative, and are in no manner intended to define the limits of the invention.

In addition, it will be recognized by those skilled in the art that the delay sections of the present invention may be operated in still other manners than those described. For example, it has been found that the delay sections of the present invention may also be operated equally well by reversing the connections of each diode within the delay sections and applying a higher potential at the terminating end of each delay section than is applied at the input end of the corresponding section.

It will also be recognized by those skilled in the art that delay lines and shifting registers according to the present invention, may be constructed by utilizing other than an integral number of delay sections. For example, shifting registers and delay lines may be constructed which include a modified terminating delay section which includes one half of a delay section as the term has been herein employed. In other words, one half of a delay section of the type shown in Figs. 1 and 4 could be utilized as a modified terminating delay section.

It should be understood, of course, that the foregoing disclosure relates to only preferred embodiments of the invention and that numerous other modifications or alterations may be made therein without departing from the spirit and scope of the invention as set forth in the appended claims.

What is claimed as new is:

1. An electrical signal stepping device for sequentially stepping applied electrical intelligence signals, said stepping device comprising: an input terminal for receiving the intelligence signals; a first control terminal; a first series circuit intercoupling said input terminal and said first control terminal, said first series circuit including a first storage capacitor coupled to said first control terminal, a first diode coupled to said input terminal, and a junction terminal coupled between said first capacitor and said first diode; a second control terminal; a second series circuit intercoupling said second control terminal and said junction terminal, said second series circuit including a second storage capacitor having first and second ends, said first end being connected to said second control terminal, and a second diode and an inductor interconnecting said junction terminal and said second end of said second capacitor; and at least one output terminal connected intermediate said second series circuit.

2. The signal stepping device defined in claim 1 wherein said first series circuit also includes a second inductor in series with said first diode for intercoupling said input terminal and said junction terminal.

3. The signal stepping device defined in claim 2 wherein said one output terminal is connected to said second end of said second capacitor.

4. The signal stepping device defined in claim 1 wherein said first diode has a first terminal connected to said input terminal and a second terminal connected to said junction terminal, and wherein said second diode has a first terminal connected to said junction terminal and a second terminal connected to said inductor.

5. The signal stepping device defined in claim 4 wherein the first terminal of each of said first and second diodes is the cathode.

6. An electrical signal stepping device for applying an electrical signal from a source of electrical intelligence signals to an electrical signal receiving element, said stepping device comprising: a first storage capacitor having first and second ends; first means for applying a periodic electrical signal to said first end of said first storage capacitor to periodically vary the voltage at said second end of said first storage capacitor; second means for applying the signals from the source to said second end of said first capacitor, said second means including an element responsive to a voltage difference of a predetermined polarity between said second end of said first capacitor and the source for normally maintaining a first predetermined charge across said first capacitor and for transferring charge between said first capacitor and the source for a predetermined time interval in response to an intelligence signal; a second storage capacitor; circuit means for normally maintaining a second predetermined charge across said second storage capacitor; third means coupled between said first and second storage capacitors, said third means being operable at the end of said predetermined time interval for transferring charge between said first and second storage capacitors to return the charge across said first capacitor to said first predetermined charge; and fourth means responsive to charge transfer between said first and second capacitors for applying an electrical signal to the signal receiving element.

7. The electrical signal stepping device defined in claim 6 wherein said element is a unidirectional current device, and the periodic electrical signal is a squarewave signal having relatively high and low voltage levels during each period.

8. The electrical signal stepping device defined in claim 6 wherein said third means includes an inductor and a unidirectional current device, the resonant frequency of said inductor and said first and second storage capacitors being substantially equal to the frequency of the periodic signal applied to said first end of said first storage capacitor.

9. An electrical signal stepping device for producing an electrical output signal corresponding to an applied electrical intelligence signal, said stepping device comprising: a first storage capacitor having first and second ends; first means for applying a periodic squarewave drive signal to said first end of said first storage capacitor to periodically vary the voltage at said second end of said first capacitor; second means connected to said second end of said first storage capacitor for receiving the applied electrical intelligence signal and for normally maintaining a first predetermined charge across said first storage capacitor, said second means including a first unidirectional current device responsive to a differential voltage of a predetermined polarity between the potential of the applied intelligence signal and the potential at the second end of said first capacitor for conducting an electrical current for a predetermined time interval to change the charge on said first capacitor; a second storage capacitor; electrical circuit means for maintaining normally a second predetermined charge across said second storage capacitor; third means, coupled between said first and second storage capacitors, said third means including a second unidirectional current device operable at the end of said predetermined time interval for transferring charge between said first and second capacitors to return the charge on said first capacitor to said first predetermined charge; and fourth means, responsive to charge transfer between said first and second capacitors for producing an electrical output signal corresponding to the applied intelligence signal.

10. A passive element signal stepping device for producing an electrical output signal at a predetermined time after the application to the device of an electrical digital intelligence signal from a source of intelligence signals, the intelligence signal having either of two voltage levels corresponding to the binary values 0 and 1, respectively, during each digit time interval, said device comprising: first and second storage capacitors; means for maintaining first and second normal charges on said first and second capacitors, respectively, said means including a first unidirectional current device responsive to a voltage difference of a predetermined polarity between the source of intelligence signals and said first capacitor for transferring charge between said first capacitor and the source during a first predetermined time interval, a second unidirectional current device responsive to a voltage difference of a predetermined polarity between said first and second capacitors for transferring charge between said first and second capacitors for a second predetermined time interval to substantially restore the normal charge on said first capacitor, and a voltage responsive element for restoring the normal charge on said second capacitor during a third predetermined time interval; and means, responsive to the charge restoration of said second capacitor for producing an electrical output signal corresponding to the applied intelligence signal.

11. An electrical signal stepping device for producing an electrical output signal corresponding to an applied electrical intelligence signal, said stepping device comprising: a first storage capacitor having first and second ends; first means for applying a periodic squarewave drive signal to said first end of said first storage capacitor to periodically vary the voltage at said second end of said first capacitor; second means connected to said second end of said first storage capacitor for receiving the applied electrical intelligence signal, said second means including a first unidirectional current device for normally maintaining a first predetermined charge on said first capacitor, said first unidirectional current device being responsive to a differential voltage of predetermined polarity between the applied intelligence signal and the potential at the second end of said first capacitor for conducting an electrical current to change the charge on said first capacitor during a first predetermined time interval; a second storage capacitor having first and second ends; third means coupled between said first and second ends of said second storage capacitor for normally maintaining a second predetermined charge thereacross; fourth means, coupled between said second ends of said first and second storage capacitors, said fourth means including a second unidirectional current device responsive to a voltage difference of a predetermined polarity between said second ends of said first and second capacitors for transferring charge between said capacitors during a second predetermined time interval to substantially restore said first predetermined charge on said first capacitor.

12. The signal stepping device defined in claim 11 wherein said third means includes a third unidirectional current device responsive to a predetermined change in potential at said second end of said second storage capacitor for restoring said second predetermined charge on said second capacitor during a third predetermined time interval.

13. The signal stepping device defined in claim 12 wherein said third means also includes an output circuit connected to said second end of said second capacitor for presenting an electrical output signal, corresponding to the applied intelligence signal, during said third predetermined time interval.

14. The signal stepping device defined in claim 11 wherein said fourth means also includes a first inductor, the resonant frequency of said inductor and said first and second capacitors being of the same order of magnitude as the frequency of said periodic squarewave drive signal.

15. The signal stepping device defined in claim 14 wherein said second means also includes a second inductor connected in series with said first unidirectional current device.

16. A shift register comprising a plurality of cascaded electrostatic storage devices, means for delivering binary-coded electrical signals to a first one of said storage devices at predetermined intervals, means connected in circuit relationship with said storage devices for establishing each of the devices in a predetermined storage condition, individual asymmetrically conductive devices connected between said delivery means and said first storage device and between each of the cascaded storage devices, and drive means providing binary-coded signals connected to said storage devices for successively changing the storage condition of said devices upon a simultaneous change in the binary character of the electrical signal delivered to said first storage device and one of said drive signals, said drive means arranged to successively shift said stored signals during the intervals between the delivery of said electrical signals.

17. A shift register comprising a plurality of cascaded voltage storage devices, voltage means coupled to the last of said devices for establishing a predetermined voltage thereon, means for delivering binary-coded information signals to a first one of said storage devices at a predetermined rate, individual polarized circuit means connected between said information delivery means and said first storage device and between each of the cascaded storage devices, and drive means connected to said storage devices and providing binary-coded electrical signals at a delivery rate higher than the predetermined rate of said information signals to thereby cause said first device to discharge upon a simultaneous change in the binary character of the information signals delivered thereto and of one of said drive signals whereby the remaining storage devices successively discharge into the previously discharged device.

18. An electrical signal stepping device for sequentially stepping applied electrical intelligence signals, said stepping device comprising: an input terminal for receiving the intelligence signals; a first control terminal; a first series circuit intercoupling said input terminal and said first control terminal, said first series circuit including a first storage capacitor coupled to said first control terminal, a first diode coupled to said input terminal, and a junction terminal coupled between said first capacitor and said first diode; a second control terminal; a second series circuit intercoupling said second control terminal and said junction terminal, said second series circuit including a second storage capacitor having first and second ends, said first end being connected to said second control terminal, and a second diode interconnecting said junction terminal and said second end of said second capacitor.

References Cited in the file of this patent

UNITED STATES PATENTS

| | | |
|---|---|---|
| 2,580,771 | Harper | Jan. 1, 1952 |
| 2,601,089 | Burkhart | June 17, 1952 |
| 2,622,213 | Harris | Dec. 16, 1952 |
| 2,624,839 | Havens | Jan. 6, 1953 |
| 2,680,819 | Booth | June 8, 1954 |
| 2,692,343 | Spiro | Oct. 19, 1954 |
| 2,708,722 | An Want | May 17, 1955 |

FOREIGN PATENTS

| | | |
|---|---|---|
| 647,030 | Great Britain | Dec. 6, 1950 |

OTHER REFERENCES

Electronic Engineering, "The physical realization of an electronic digital computor," by A. D. Booth, pages 492 to 498, December 1950.

Journal of Applied Physics, "Static magnetic storage and delay line," by Wang et al., January 1950, pages 49 to 54.